US007575162B1

(12) United States Patent
Malchak et al.

(10) Patent No.: US 7,575,162 B1
(45) Date of Patent: Aug. 18, 2009

(54) SELF-CHECKOUT SYSTEM AND METHOD

(75) Inventors: Christopher A. Malchak, Alpharetta, GA (US); Leila Parker-Malchak, Alpharetta, GA (US)

(73) Assignee: NCR Corporation, Dayton, OH (US)

(*) Notice: Subject to any disclaimer, the term of this patent is extended or adjusted under 35 U.S.C. 154(b) by 547 days.

(21) Appl. No.: 11/270,131

(22) Filed: Nov. 9, 2005

(51) Int. Cl.
*G06K 15/00* (2006.01)

(52) U.S. Cl. ........................ 235/383; 235/385; 235/375

(58) Field of Classification Search ................. 235/383, 235/385, 375
See application file for complete search history.

(56) References Cited

U.S. PATENT DOCUMENTS

2003/0075602 A1* 4/2003 Wike et al. .................. 235/383
2005/0184147 A1* 8/2005 White ........................ 235/383
2006/0076406 A1* 4/2006 Ulrich et al. ................ 235/383
2008/0048029 A1* 2/2008 Crockett et al. ............. 235/383

* cited by examiner

*Primary Examiner*—Karl D. Frech
(74) *Attorney, Agent, or Firm*—Harden E. Stevens, III

(57) ABSTRACT

An improved self-checkout system and method which reduces transaction time. The self-checkout system includes a carrier for carrying a selected product, the carrier being coupled to a weighing apparatus for generating a first signal indicative of the actual weight of the product, an RFID tag interrogator for interrogating an RFID tag attached to the product and receiving product identification information relating to the product, an interface that is responsive to the received product identification information for communicating with a product information database to obtain weight information relating to the product, and a processor being responsive to: the obtained weight information for generating a second signal indicative of the expected weight; and the first and second signals for generating an alert signal.

32 Claims, 3 Drawing Sheets

SELF-CHECKOUT SYSTEM AND METHOD

FIELD OF THE INVENTION

The present invention relates to a self-checkout system and a method of operating a self-checkout system. In the preferred embodiment, the invention relates to a checkout system for use in a retail environment.

BACKGROUND

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer or user without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security.

Furthermore, the requirement that the customer scans each item results in the checkout procedure being time-consuming.

What is needed therefore is a self-service checkout terminal which overcomes one or more of the above-mentioned drawbacks.

SUMMARY

In accordance with a first aspect of the invention, there is provided a self-checkout system comprising: a carrier for carrying a selected product, the carrier being coupled to a weighing apparatus for generating a first signal indicative of the actual weight of the product; an RFID tag interrogator for interrogating an RFID tag attached to the product and receiving product identification information relating to the product; an interface that is responsive to the received product identification information for communicating with a product information database to obtain weight information relating to the product; and a processor being responsive to: the obtained weight information for generating a second signal indicative of the expected weight; and the first and second signals for generating an alert signal.

Thus, the self-checkout system is responsive to the actual weight of products for alerting a user in the event of at least some improprieties.

A method of operating a self-checkout system includes the steps of: providing a carrier for carrying a selected product; weighing the product and generating a first signal indicative of the actual weight of the product; interrogating an RFID tag attached to the product and receiving product identification information relating to the product; communicating with a product information database using the received product identification information to obtain weight information relating to the product; generating a second signal indicative of the expected weight in dependence upon the obtained weight information; and generating an alert signal in dependence upon the first and second signals.

Another aspect provides a self-checkout system comprising: a carrier for carrying a selected product, the carrier being coupled to a weighing apparatus for generating a first signal indicative of the actual weight of the product; an RFID tag interrogator for interrogating an RFID tag attached to the product and receiving a response signal; and a processor being responsive to: the response signal for deriving the weight of the product and generating a second signal indicative of the expected weight; and the first and second signals for generating an alert signal.

Yet another aspect provides a self-checkout system comprising: a carrier for carrying a selected product, the carrier being coupled to a weighing apparatus for generating first signal indicative of the actual weight of the product; an RFID tag interrogator for interrogating an RFID tag attached to the product and receiving from the tag weight information indicative of the weight of the product; a processor being responsive to: the received weight information for generating a second signal indicative of the expected weight of the products; and the first and second signals for generating an alert signal.

It is therefore an object of the present invention to provide a new and useful self-checkout system and method of operating such a system.

It is moreover an object of the present invention to provide a system and method which will alert a user (for example a customer or an operator) to a difference between an actual weight of selected products and an expected weight, to reduce the instances of errors such as damaged goods being purchased, or other improprieties such as theft.

The above and other objects, features and advantages of the present invention will become apparent from the following description and the attached drawings.

DETAILED DESCRIPTION

Figure 1:
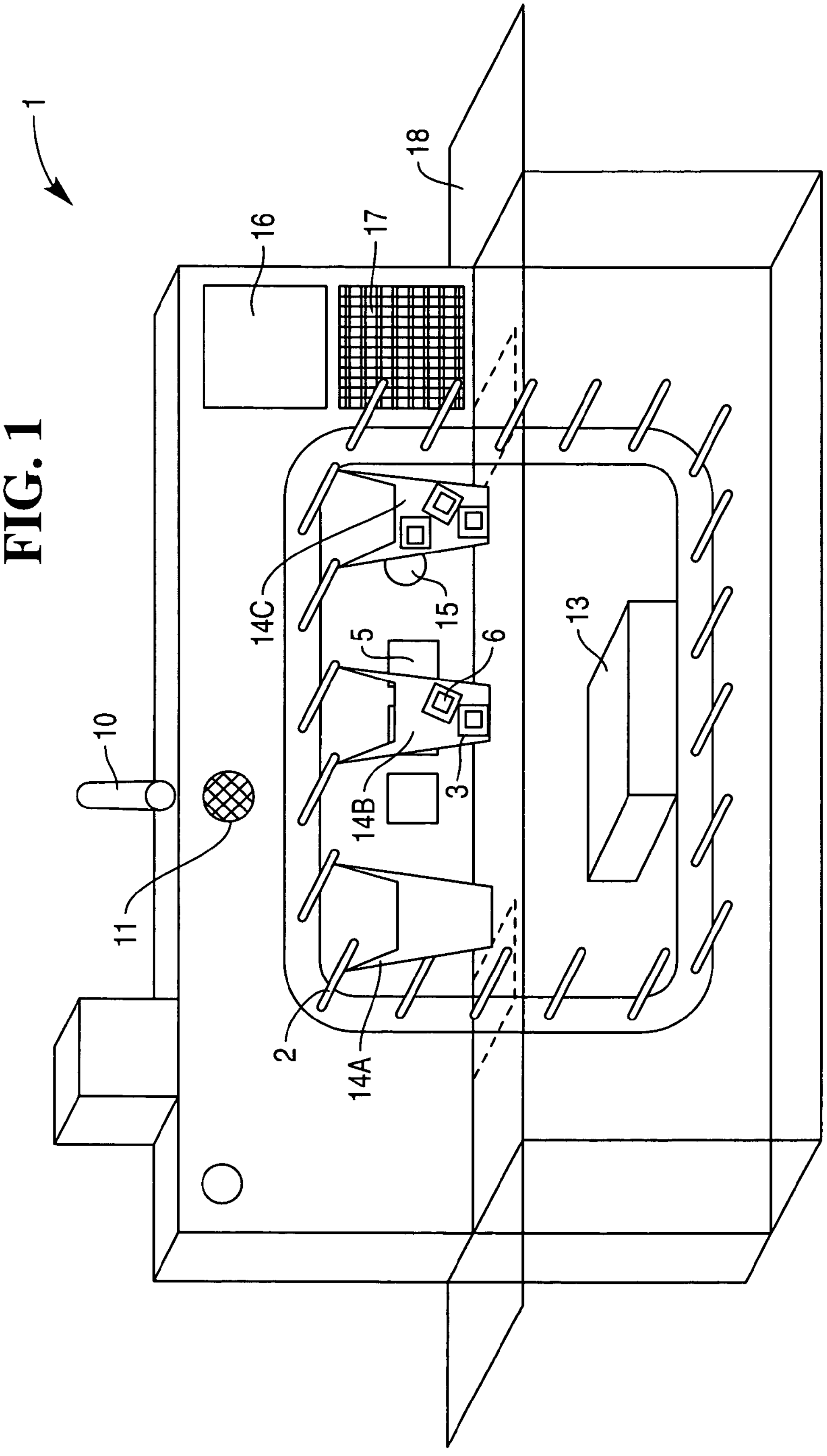
FIG. 1 is a perspective view of a self-checkout system incorporating features of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims. References to particular modifications, equivalents and alternatives in the following are exemplary only and are not to be considered an exclusive list of the embodiments falling within the spirit and scope of the invention.

In broad overview, an aim of the invention is provide a self-checkout system in which a user, for example a customer in a grocery store, may effect a transaction, by simultaneously placing a number of selected items in a carrier bag suspended on a conveyor without having first to scan barcodes or other optical indicia or having to input data manually. Instead, the self-checkout system reads data from RFID tags attached to the items sequentially or simultaneously substantially immediately as the items are placed into the primary carrier suspended bag location. If necessary, the system may use this RFID data to obtain further data from one or more other product databases and other data-related stores to assist in the sale. Additional data relating to the items, including price data, is added to a list of items to be purchased in the transaction via existing store provided data stores. In addition, the self-checkout system senses the change in the weight on the conveyor, and compares this change in weight with an expected change calculated with reference to the data read from the RFID tags and/or further data extracted from the database. In the event of equality, within a predetermined tolerance, between the actual and expected change in weight, the self-checkout system allows the user to continue with the transaction by finalizing and effecting payment, by adding further items to the carrier, or by advancing the conveyor to allow use of a further carrier bag. In the event that the actual and expected change in weight does not match, or in the event that the weight of a carrier bag changes after it has been advanced, a supervisor may be alerted. The self-checkout system is able to identify the bag at which the discrepancy occurred.

Items that are sold by weight are handled by any of a variety of methods. For example, these items may also have RFID tags attached. Upon reading the RFID tag on an item sold by weight, the checkout system may alert a supervisor. Alternatively, customers may be required to pre-bag and weight such items, for example produce, in the produce department where an appropriate RFID tag or barcode is provided to enable the sale of the item to be handled by the self-checkout system. A preferred embodiment of the system therefore includes a traditional barcode scanner. In a further alternative, items traditionally sold by weight are pre-packaged in a variety of weights and have attached appropriately programmed RFID tags so that these items are handled in the same was as other items.

In a preferred embodiment, the self-checkout system is physically proportioned such that the RFID tags on items in a number of carrier bags may be read simultaneously. Thus, a customer may move an item between bags without causing the system to alert a supervisor. Further preferred embodiments include RFID tag programming devices for programming replacement tags when a tag has been lost from an item and the product weight and price were known or learned in a data store. Products with missing or defective RFID tags can also be located to the bag location level.

Thus, it may be possible to effect the checkout operation quickly and easily, without need for manually scanning items, opening carrier bags, or rechecking individual items in multiple carrier bags in the event of a discrepancy.

Figure 2:
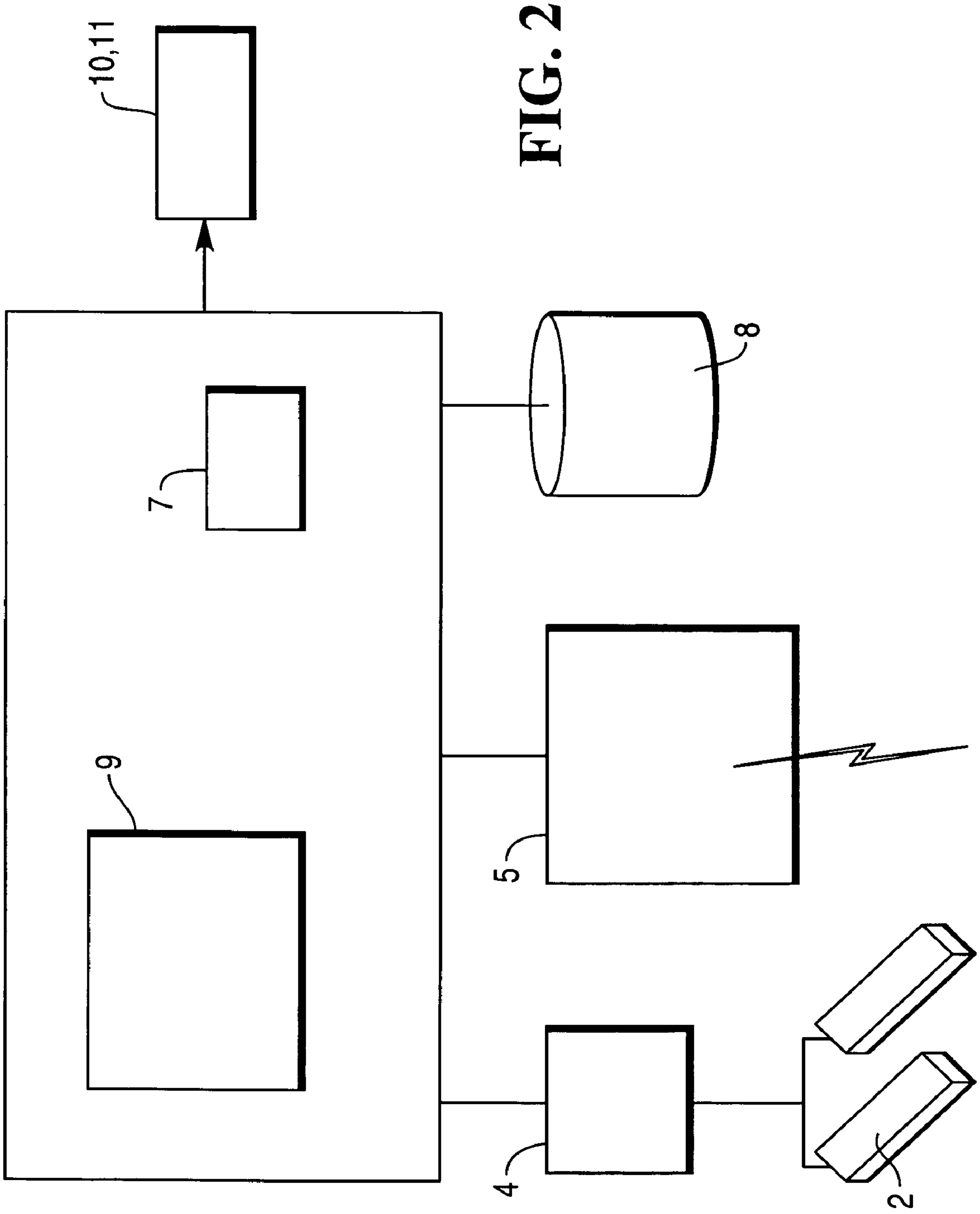
FIG. 2 is a schematic view of the system shown in FIG. 1.

Referring now to FIGS. 1 and 2, there is shown a self-checkout system including a self-checkout terminal 1 for use in a retail business such as a grocery store. The self-checkout terminal 1 includes a plurality of sequentially-arranged carriers 2 in a continuous loop for carrying products 3 selected by a customer. The carriers 2 are coupled to a weighing apparatus 4 which weighs products 3 added to a carrier 2 and generates a first signal indicative of the actual weight of the products added to the carrier. In a particularly preferred embodiment, the carriers are coupled to the weighing apparatus in manner which enables the weight of products on or suspended by a carrier, or a pair of adjacent carriers to be determined independently of the other carriers.

A number of RFID tag interrogators 5 are provided for generating an RFID interrogation field for interrogating RFID tags 6 attached to products 3 carried by carriers 2 in the interrogation field and receiving product identification information relating to those products. An interface 7 uses the received product identification information for extracting from a product information database 8 weight information and price information relating to the products 3.

A processor 9 receives the weight and price information and generates a second signal indicative of the expected weight of the product or products. Price information is handled in a manner known in connection with point of sale apparatus: for example the user may be presented with the cost of each item as it is added to the carrier and/or a subtotal cost, and a final cost. The processor 9 also generates an alert signal when the first and second signals (relating to the actual weight and the expected weight of the products) satisfy one or more predetermined condition. In a particularly preferred embodiment, the predetermined condition is that the actual weight and the expected weight differ by greater than a predetermined threshold.

A prompter in the form of an alert light 10 and a speaker 11 is provided for visual and audible alerts to a user in response to the alert signal. In some embodiments, the audible alerts include alarms. In other embodiments, the audible alerts include speech alerts providing information about the inequality. In yet further embodiments, the prompter includes a display screen upon which text is displayed providing information about the inequality. In some embodiments, the user is the customer. However, preferred embodiments are intended to be supervised by a member of the retailer's personnel, who assists customers with resolution of problems.

Turning to FIG. 1 in detail, in the embodiment shown, the carriers 2 are coupled to a user-operable conveyor 12 which moves the carriers 2 in a predetermined direction (for example clockwise as shown in FIG. 1). In a preferred embodiment, a receptacle provider 13, upstream of the interrogation field generated by the interrogators 5, attaches receptacles having a known or negligible weight such as grocery bags 14 to the carriers 2, into which a customer may place their selected products. In some such embodiments in which the receptacles are substantial, the predetermined threshold is related to the weight of the receptacle. Alternatively, the inequality threshold is a percentage of either the actual weight or the expected weight.

When a user wishes to purchase items, the conveyor 12 is operated to move a grocery bag 14 into the interrogation field generated by the RFID tag interrogators 5. The user then adds selected products to the grocery bag 14B in the interrogation field. In a preferred embodiment, the weight of a bag or bags 14A upstream of the interrogation field is monitored to ensure that products are not added to it. Products may be added to the bag 14B in the interrogation field individually or in groups according to the preference of the user. The placement of one or more products in the bag 14B causes a change in weight. In response to this change, the interrogators 5 interrogate the tags on the products in the bag, and product information including expected weight is extracted from the database 8.

The actual weight of the added product or products is determined by subtracting the previously measured weight from the new weight.

An alert signal is generated in the event of an inequality between the expected weight of the added product or products and the actual weight of the added product or products.

In an alternative embodiment, the interrogators 5 interrogate tags within range periodically and the bag 14B in the interrogation field is weighed, preferably simultaneously. In either case, the addition of a product or products to a bag 14 causes an increase in weight, which is measured, and the presence of a further tag or tags, which is (are) interrogated.

In the event that the expected weight, derived from product information obtained by interrogating the tag or tags, is less than the actual weight, the prompter 10, 11 alerts the user. Furthermore, an alert is raised in the event that an increase in weight is detected without an additional tag being found. In most retail embodiments, these alerts are intended for the operator, since they may indicate that an item is present from which the tag has been removed or tampered with. Such an alert may also simply indicate that an RFID tag has not been read or has been read incorrectly, requiring intervention by the operator.

The prompter also alerts the user when the expected total weight is greater than the actual total weight. This alert may indicate that a tag is present which has accidentally become detached from its object, or it may indicate that a part of a product is missing. Such an inequality may also indicate the incorrect reading of an RFID tag.

When a bag is full (for example as determined by weighing the bag) or when all of the desired products have been added, the user moves the bag 14B downstream towards point of sale apparatus by operation of the conveyor. However, operation of the conveyor is disabled in the event of an alert until the circumstances giving rise to the alert have been rectified.

A receptacle sensor 15 is provided downstream of the interrogators 5, for sensing the presence of a receptacle 14C and a conveyor controller responds to the receptacle sensor by halting the conveyor when a receptacle is sensed, to allow a user to remove the receptacle.

In a preferred embodiment, in which a number of bags may be carried at the same time but only one of the bags is in the interrogation field set up by the interrogators 5, the weight of the other bags is monitored to ensure that their contents are not tampered with and that further items are not inserted. In the event of a change in the weight of such a bag of greater than a predetermined threshold, an alert is raised as described above.

Point of sale apparatus including a display 16 and a user input device 17 communicates the total cost to a customer and receives payment in a known manner. In a particularly preferred embodiment, the system uses NCR Inc.'s FastLane user interface.

The terminal 1 controls when the customer may remove bags from the carriers, raising an alert if a bag is removed without this being authorised by the terminal. Thus, if a customer has selected a large number of products for purchase, it may arise that all carriers 2 within and downstream of the interrogation field are occupied by bags 14 which are full of products. Therefore, in a particularly preferred embodiment, the user input device 17 allows the user to indicate that further bags are required. In response to such an indication, the terminal 1 allows the customer to remove the furthest downstream bag or bags 14C so that the conveyor may be advanced, providing more bags for the further products. In one such embodiment, a surface 18 is provided onto which the removed bags are to be placed. In a particularly preferred such embodiment, the surface 18 is also coupled to a weighing apparatus and the weight of the bags placed on the surface is monitored so that the unauthorised addition or removal of items from the bags may be identified and an alert raised as appropriate. In a preferred embodiment, the terminal prevents removal of a bag other than when all stations are full and further bags are required, or when payment for all items has been effected.

In a particularly preferred embodiment, the self-checkout system is integrated with a stock control system, and information from the point of sale apparatus together with the product identification information obtained from the RFID tags is used to update stocking information.

Figure 3:
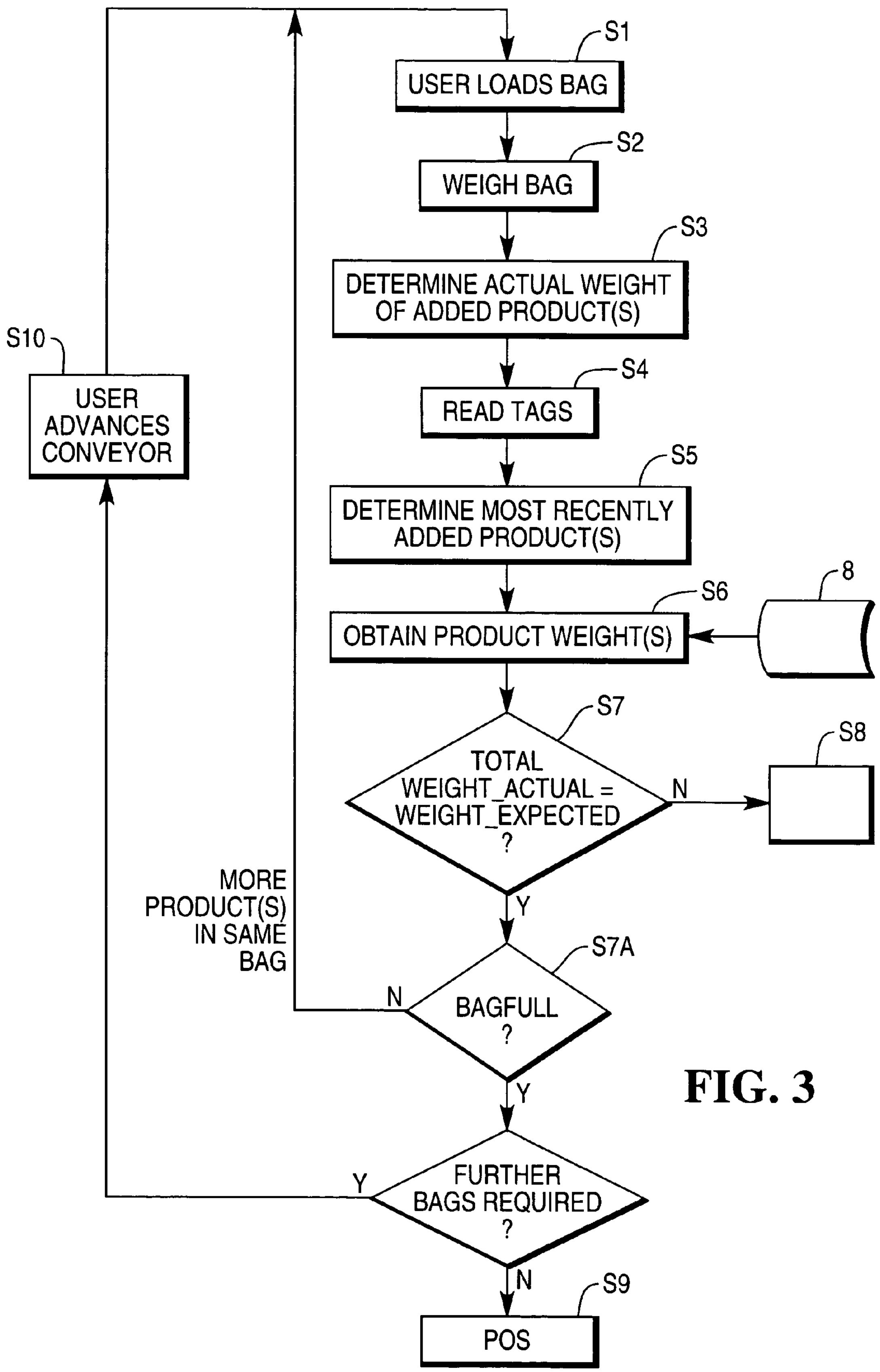
FIG. 3 is a flow-chart showing steps in the method of operation of the system shown in FIG. 1.

The method of operating a particularly preferred embodiment of the system is illustrated in FIG. 3. At step S1, the customer loads a selected product or products into a grocery bag 14 carried by the carriers 2. The bag is weighed at step S2, and the actual weight of the added product is determined at step S3 by subtracting the previous total weight from the new total weight. The RFID tags attached to the products are read at step S4, and the identification information for the product or products added since the last interrogation is determined at step S5 by comparison between the present data received from tags and the previous data received from tags. In a particularly preferred embodiment, the tags are read simultaneously with the weighing of the bag so that an alert may be raised immediately, if appropriate. The identification information for the most recently added product or products is used to extract respective product weight and price information, at step S6, from a database 8. In the event of more than one product having being added, the total expected weight for the added products is determined by summing the respective expected weights. The actual and expected weights are compared at step S7 to determine whether they are within a predetermined tolerance of one another. If they are not, an alert is raised at step S8. If the weights are within tolerance, the point-of-sale apparatus updates a running subtotal at step S9. If no alert is raised, or the conditions which caused the raising of an alert have been removed, the user or supervisor may optionally, at step S10 advance a bag (for example which is full) out of the RFID interrogation field to continue adding products to a further bag or bags.

In the embodiment described above, products are processed on an ongoing basis as they are added to the bags either individually or in groups according to customer preference. In an alternative embodiment, products are loaded into a bag upstream of the interrogation field. When the bag is full (or when all selected products have been added), the bag is advanced into or through the interrogation field. The total weight of the bag is measured and the product information for all products is extracted as described above. In another embodiment in which no conveyor is provided, a user simply either places a bag containing products onto a surface within the interrogation field or hangs the bag on carriers in the field and the bag is weighed and the tags read.

In a further preferred embodiment, the terminal is provided in a warehouse in which a number of items are picked from a plurality of locations and transported together for delivery to a customer or for assembly in a manufacturing facility. Discrepancies in weights may indicate that picked items are incomplete, that items are missing (but their tags are present) or that extra items are present. In yet a further preferred embodiment, a terminal is provided in a goods transportation facility where it is used, perhaps in conjunction with x-ray or other imaging technology, to authenticate the contents of shipments.

In any described application, the expected weight information may be derived from respective product information in a product information database 8 as described above. However, in an alternative example, the weight information are stored on the respective RFID tags 6 themselves and extracted by the RFID tag readers 5.

As indicated above, self-checkout terminals exist. However, a number of advantages over the existing terminals are obtained in at least the most preferred embodiments of the invention. These advantages include, for example increased checkout speed; increased convenience for the customer, particularly in embodiments in which full bags remain suspended so they may be retrieved easily when payment is ultimately made for the selected products; scalability, in that units may be made with a single immobile carrier or pair of carriers or with sufficient carriers to carry any desired number of receptacles; avoiding reliance upon optical barcode reading technology; possibility of integration with stock control systems; and the ability to identify a locate a problem down to a particular bag, group of items or even individual item.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected. In particular, while the invention has been described largely with reference to its use with a plurality of selected products, the invention is equally applicable in the event that only one product is selected. Thus, except where the opposite intention is clear, use of the plural "products" may be taken to include use of the singular "product".

What is claimed is:

1. A self-checkout system comprising:

a carrier receptacle suspended on a conveyor for carrying a selected product, the carrier receptacle being coupled to a weighing apparatus for generating a first signal indicative of the actual weight of the product;

an RFID tag interrogator for interrogating an RFID tag attached to the product in the carrier receptacle and receiving product identification information relating to the product;

an interface that is responsive to the received product identification information for communicating with a product information database to obtain weight information relating to the product; and a processor being responsive to: the obtained weight information for generating a second signal indicative of the expected weight; and the first and second signals for generating an alert signal.

2. The system of claim 1 wherein:

the weighing apparatus determines the respective actual weights of products successively-added to the carrier receptacle by comparing a new total weight with a previous total weight, and generates respective first signals;

the RFID tag interrogator interrogates respective RFID tags attached to the products and receives respective product identification information;

the interface obtains respective weight information relating to the successively-added products; and the processor is responsive to the respective obtained weight information for generating respective second signals; and to the respective first and second signals for generating an alert signal.

3. The system of claim 2 wherein the prompter provides a visual alert to the user.

4. The system of claim 1 wherein the weighing apparatus determines the actual total weight of a plurality of products carried by the carrier receptacle and the second signal is indicative of the expected total weight of the products.

5. The system of claim 1 comprising a prompter responsive to the alert signal for alerting a user to an inequality greater than a predetermined threshold between the expected weight and the actual weight.

6. The system of claim 5 wherein the prompter alerts the user to the expected weight being greater than the actual weight.

7. The system of claim 5 wherein the threshold is a percentage of either the total weight or the expected weight.

8. The system of claim 5 wherein the threshold is related to the weight of the carrier receptacle provided for containing the product.

9. The system of claim 5 wherein the prompter provides an audible alert to the user.

10. The system of claim 5 wherein the prompter alerts the user to the actual weight being greater than the expected weight.

11. The system of claim 1 wherein the carrier receptacle is coupled to a user-operable conveyor for conveying the carrier.

12. The system of claim 11 wherein the conveyor is adapted to convey the carrier receptacle only when no alert signal is generated.

13. The system of claim 11 further comprising a receptacle provider, upstream of the interrogator, for attaching a receptacle to the carrier to enable a user to place the product in the receptacle.

14. The system of claim 11 further comprising a receptacle sensor, downstream of the interrogator, for sensing the presence of a receptacle and a conveyor controller responsive to the receptacle sensor for causing the conveyor to halt when a receptacle is sensed, to allow a user to remove the receptacle.

15. The system of claim 11 comprising a plurality of sequentially-arranged carrier receptacle providers.

16. The system of claim 15 wherein the plurality of carrier receptacle providers are arranged in a continuous loop.

17. The system of claim 1 wherein the interface further obtains from the database pricing information indicative of the price of the product, and including point of sale apparatus for communicating the cost to a customer and for receiving payment.

18. A method of operating a self-checkout system comprising the steps of:

providing a carrier receptacle suspended on a conveyor for carrying a selected product;

weighing the product in the carrier receptacle and generating a first signal indicative of the actual weight of the product;

interrogating an RFID tag attached to the product in the carrier receptacle and receiving product identification information relating to the product;

communicating with a product information database using the received product identification information to obtain weight information relating to the product;

generating a second signal indicative of the expected weight in dependence upon the obtained weight information; and generating an alert signal in dependence upon the first and second signals.

19. The method of claim 18 further comprising:

determining the respective actual weights of products successively-added to the carrier receptacle by comparing a new total weight with a previous total weight and generates respective first signals;

interrogating respective RFID tags attached to the products and receiving respective product identification information;

obtaining respective weight information relating to the successively-added products; and generating respective second signals in response to the respective obtained weight information.

20. The method of claim 18 comprising determining the actual total weight of a plurality of products carried by the carrier receptacle and wherein the second signal is indicative of the expected total weight of the products.

21. The method of claim 18 comprising alerting a user to an inequality greater than a predetermined threshold between the expected weight and the actual weight.

22. The method of claim 21 comprising alerting the user to the actual weight being greater than the expected weight.

23. The method of claim 21 comprising alerting the user to the expected weight being greater than the actual weight.

24. The method of claim 21 wherein the threshold is a percentage of either the actual weight or the expected weight.

25. The method of claim 21 wherein the threshold is related to the weight of the carrier receptacle provided for containing the product.

26. The method of claim 21 comprising providing an audible alert to the user.

27. The method of claim 21 comprising providing a visual alert to the user.

28. The method of claim 18 comprising conveying the carrier receptacle in response to user input.

29. The method of claim 28 comprising conveying the carrier receptacle only when no alert signal is generated.

30. The method of claim 18 comprising obtaining from the database pricing information indicative of the price of the product, and communicating the cost to a customer.

31. A self-checkout system comprising:

a carrier receptacle for carrying a selected product, the carrier receptacle being coupled to a weighing apparatus for generating a first signal indicative of the actual weight of the product;

an RFID tag interrogator for interrogating an RFID tag attached to the product in the carrier receptacle and receiving a response signal; and a processor being responsive to: the response signal for deriving the weight of the product and generating a second signal indicative of the expected weight; and the first and second signals for generating an alert signal.

32. A self-checkout system comprising:

a carrier receptacle for carrying a selected product, the carrier receptacle being coupled to a weighing apparatus for generating first signal indicative of the actual weight of the product;

an RFID tag interrogator for interrogating an RFID tag attached to the product in the carrier receptacle and receiving from the tag weight information indicative of the weight of the product; and a processor being responsive to:

the received weight information for generating a second signal indicative of the expected weight of the products; and the first and second signals for generating an alert signal.

* * * * *